(12) United States Patent
Spanski et al.

(10) Patent No.: US 7,222,437 B2
(45) Date of Patent: May 29, 2007

(54) COMBINED STUD FINDER AND TAPE MEASURE DEVICE

(75) Inventors: Jeffrey L. Spanski, Weddington, NC (US); John C. Smith, Denver, NC (US); Derek J. Nash, Huntersville, NC (US); Daily Gist, Huntersville, NC (US); Michael Williams, Emporia, KS (US)

(73) Assignee: Irwin Industrial Tool Company, Hunterville, NC (US)

( * ) Notice: Subject to any disclaimer, the term of this patent is extended or adjusted under 35 U.S.C. 154(b) by 0 days.

(21) Appl. No.: 11/186,646

(22) Filed: Jul. 21, 2005

(65) Prior Publication Data
US 2006/0021243 A1    Feb. 2, 2006

Related U.S. Application Data

(60) Provisional application No. 60/590,064, filed on Jul. 21, 2004.

(51) Int. Cl.
*G01B 3/10* (2006.01)
(52) U.S. Cl. ....................................... 33/760
(58) Field of Classification Search ........... 33/760
See application file for complete search history.

(56) References Cited

U.S. PATENT DOCUMENTS

| 4,700,489 A |   | 10/1987 | Vasile |        |
|-------------|---|---------|--------|--------|
| 5,077,910 A | * | 1/1992  | Smith .......................... | 33/760 |
| 5,222,303 A | * | 6/1993  | Jardine ........................ | 33/528 |
| 5,253,421 A | * | 10/1993 | Landmark .................... | 33/760 |
| 5,379,524 A | * | 1/1995  | Dawson ....................... | 33/760 |
| 6,082,019 A | * | 7/2000  | Lapp et al. .................... | 33/760 |
| 6,658,755 B2 | * | 12/2003 | Arlinsky ...................... | 33/760 |

(Continued)

FOREIGN PATENT DOCUMENTS

EP    1 341 005    9/2003

(Continued)

OTHER PUBLICATIONS

"Stud Sensor," one page printed from http://www.homedepot.com on Jul. 2, 2004.

(Continued)

*Primary Examiner*—Christopher W. Fulton
(74) *Attorney, Agent, or Firm*—Marshall, Gerstein & Borun LLP

(57) ABSTRACT

A combined stud finder and tape measure device includes a housing having any traditional stud finder circuitry integrally disposed therein along with a tape measure having a tape strip wound on a spindle. The tape measure is oriented so that the width of the tape strip lies parallel to the surface being scanned for studs or other obstacles. This orientation accommodates a wide viewing angle of the scale markings on the tape strip, making it easier to use the stud finder and the tape measure at the same time. Additionally, the tape measure can be re-oriented over at least 180 degrees so that the tape strip can be directed to either side of or from the bottom of the combined stud finder and tape measure device. Detents may be located at, for example, 90 degree intervals to provide a manner of locking the tape measure at predetermined angles with respect to the housing.

15 Claims, 6 Drawing Sheets

U.S. PATENT DOCUMENTS 6,810,598 B2 * 11/2004 Boys .......................... 33/528
7,055,261 B2 *  6/2006 Nam .......................... 33/760

FOREIGN PATENT DOCUMENTS

EP         1 367 364     12/2003

OTHER PUBLICATIONS

International Search Report issued in PCT/US2005/025870 mailed on Dec. 23, 2005.

Written Opinion of the International Searching Authority issued in PCT/US2005/025870 mailed on Dec. 23, 2005.

* cited by examiner

COMBINED STUD FINDER AND TAPE MEASURE DEVICE

PRIORITY CLAIM

This application claims priority to U.S. Provisional Patent Application No. 60/590,064 filed Jul. 21, 2004.

TECHNICAL FIELD

This disclosure relates to construction tools and more particularly to a combined stud finder and tape measure device.

BACKGROUND

As is known, stud finders are used to locate a stud or other obstacle behind drywall or other surface finish that prevents visual determination of the location of the obstacle. The stud finder is often used to locate a hidden stud for the purpose of using the stud as a support or mounting point for various objects, for example, pictures, shelves, hanging plants, bicycle holders, etc.

Once a stud is found, a builder, homeowner or handyman may often need to locate a point of interest a certain distance from the stud. For example, the point of interest may be another stud or a point located a certain distance from the stud, such as a picture location or a height from a floor, a ceiling, etc. This locating action can often involve marking the wall with the stud location, putting the stud finder down and then using a tape measure to locate the point of interest. Unfortunately, this process involves numerous steps, is time consuming, and is prone to inaccuracy.

Stud finders having built-in tape measures are known. However, one such combined device limits the routing of the tape strip of the tape measure to one direction, that is, in line with the length of the stud finder, which is not useful in many applications. Additionally, the combined device orients the tape strip perpendicular to the wall or the surface being scanned, so that the scale markings on the tape strip can only be read from one side of the stud finder, which makes the tape measure hard to use. Similarly, a combination stud finder and tape measure disclosed in U.S. Pat. No. 4,700,489 includes a fixed-orientation tape measure mounted perpendicularly to the stud finder.

SUMMARY OF THE DISCLOSURE

An enhanced combined stud finder and tape measure device enables use of the tape measure in many situations in which the above-described devices are not useful. The combined stud finder and tape measure device includes a housing having a tape measure mounted therein so that the tape strip of the tape measure is disposed parallel to the surface being scanned and so that the scale markings on the tape strip are visible from virtually any angle. Further, the tape measure is rotatably mounted in the housing so that the tape measure can be rotated, thus enabling the tape strip to be routed to either side of or below the stud finder.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

A combined stud finder and tape measure device includes a stud locating apparatus for detecting studs or other obstacles and a rotatably mounted tape measure. The stud locating apparatus operates by detecting density or capacitance changes or changes in a magnetic field caused by a stud or metallic objects, such as conduit, wires, screws and nails embedded in a stud, etc. The locating apparatus typically may be used for finding studs or other obstacles behind finishing materials, for example, drywall, plaster, paneling, or siding. Such finishing materials can be found in most common residential, commercial and industrial construction. Typically, studs used to support these finishing materials are made of wood, but can be of other material such as steel. Of course, many finishing materials, particularly drywall, are finished to a smooth, flat surface making it nearly impossible in finished construction to locate the studs visually or manually. Because finishing materials rarely have the mechanical strength to support items such as pictures or shelves, it is important to know the location of studs when mounting such items to a wall so that fasteners can be attached directly to the studs, thereby providing increased mechanical support for the mounted item. The stud finder apparatus is useful for the purpose of finding studs and other obstacles.

As discussed above, locating a stud or other structure behind a surface may only be a first step in a project. Once found, the stud may become a measuring point for additional operations. The tape measure of the combined stud finder and tape measure device is useful for this purpose. For example, a handyman may need to measure a height above the floor or a distance from a ceiling when mounting a picture or shelves. In another example, a contractor may need the distance from the stud to a corner or other section of a wall for determining a length of a shelving section, or may need to locate a spot between studs or to locate the position of other studs by first finding a given stud and then measuring a distance from that stud.

Figure 1:
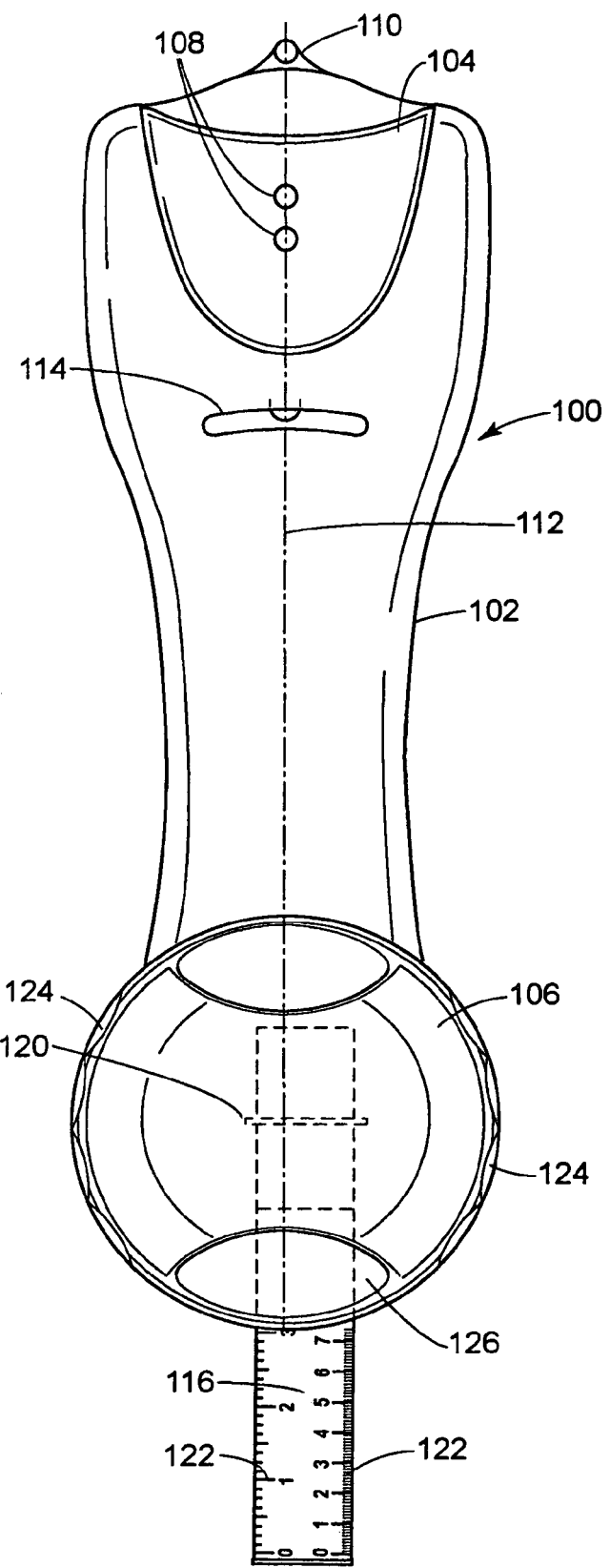
FIG. 1 is a front view of a combined stud finder and tape measure device showing a tape measure at a first position.

Referring to FIG. 1, an enhanced stud finder 100 includes a housing 102 with a stud locating apparatus 104 and a tape measure 106 incorporated therein. During operation, the stud locating apparatus 104 is used to find a stud or other obstacle and the tape measure 106 can then be used to measure a distance from the housing 102 to a point of interest, as discussed above.

The housing 102 may be manufactured from any of a number of materials according to weight and durability requirements. For example, the housing 102 can be made of a high impact plastic, a formed powdered metal, or stainless steel. The housing 102 may be contoured, as is illustrated in, for example, FIG. 1, for easy handling and may include an attachment point 110 for hanging the enhanced stud finder 100. The attachment point 110, of use when, for example, a stud has been located and further steps such as measurements are to take place, may be located on a central axis 112 through the center of gravity of the enhanced stud finder 100. Because of this location of the attachment point 110, the enhanced stud finder 100 will tend to hang vertically when suspended from the attachment point 110. To help enhance measurement accuracy, a level 114, for example, a bubble vial, can be integrated into the housing 102. This feature may help ensure that measurements made with the tape measure 106 are made true with respect to vertical.

The stud locating apparatus 104 may include any typical or known stud finding circuitry (not depicted) disposed therein. In particular, the stud finding circuitry may be any of several known in the art, such as the circuitry disclosed in U.S. Pat. No. 4,099,118. As illustrated in FIG. 1, the stud locating apparatus 104 may have one or more light emitting diodes (LEDs) 108 (two are shown in FIG. 1) for indicating the presence of a stud, an edge of a stud, or other obstacle. The stud locating apparatus 104 is typically effective in both upright and inverted positions, allowing the tape measure 106 to be extended up toward a ceiling or down to a floor when in use. The stud locating apparatus 104 is typically located in the housing to direct a stud finding signal through the back face 118, so that in use, the enhanced stud finder 100 is most effective when the back face 118 is held flush to a surface to be scanned (not depicted).

Figure 2:
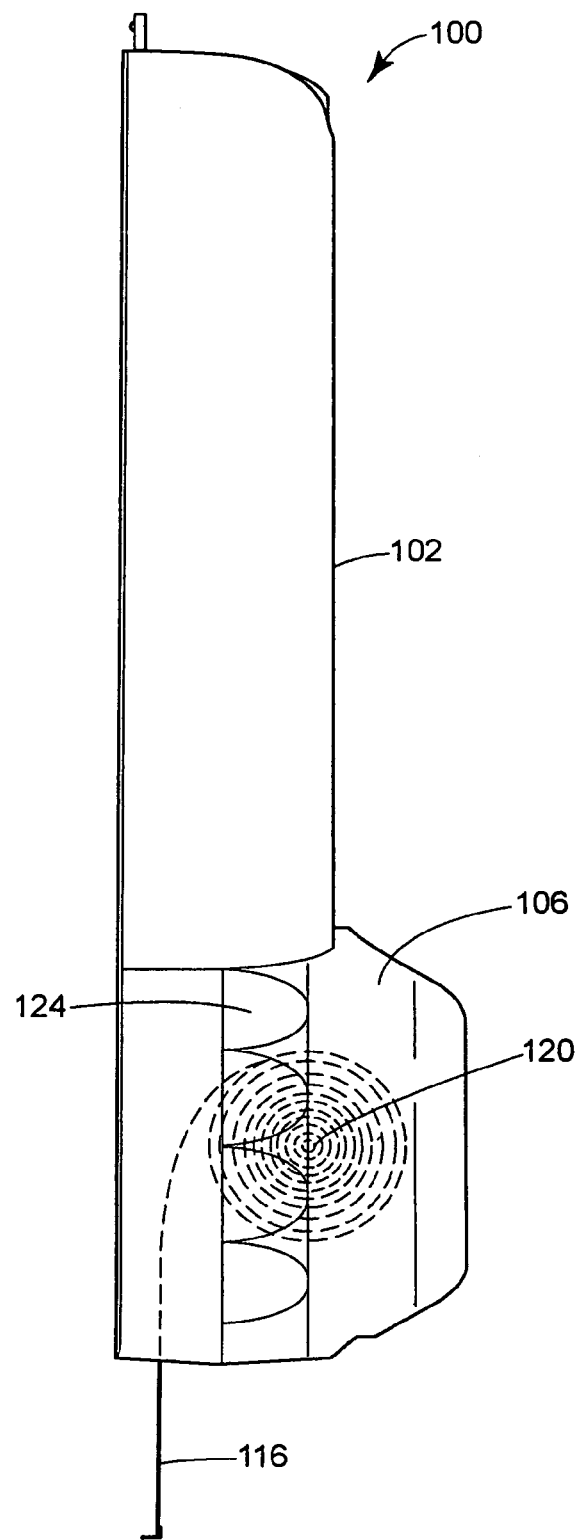
FIG. 2 is a side view of the combined stud finder and tape measure device of FIG. 1.
Figure 3:
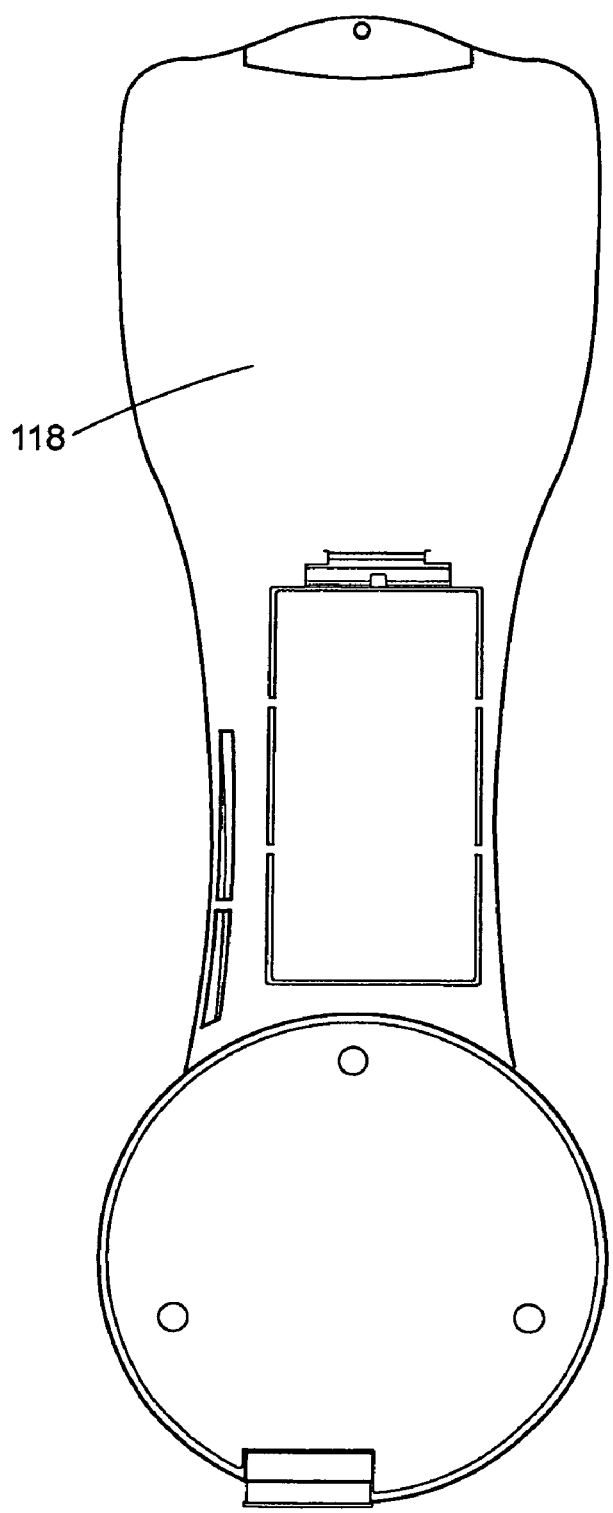
FIG. 3 is a back view of the combined stud finder and tape measure device of FIG. 1.
Figure 4:
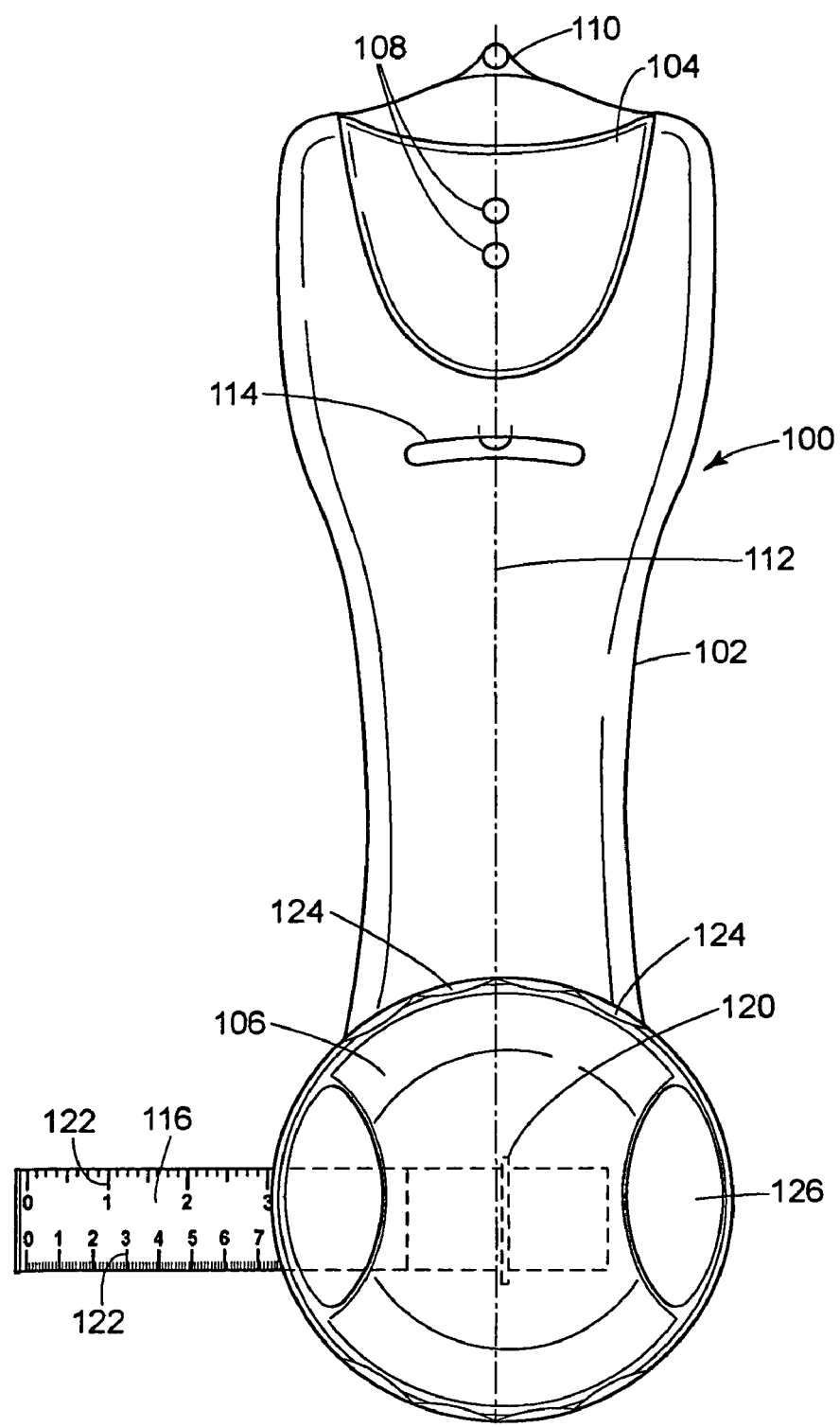
FIG. 4 is a front view of the combined stud finder and tape measure device of FIG. 1 showing the tape measure at a second position.

The tape measure 106, which may be constructed similarly to commonly found tape measures, includes a tape strip 116 having a measurement scale 122 thereon with the tape strip 116 wound around a spindle 120. As is common among tape measures, the spindle 120 may be attached to a wind-up retractor spring (not depicted) for rewinding the tape strip 116 on the spindle 120 when the tape measure 106 is not in use. As illustrated in FIG. 3, a back face 118 of the enhanced stud finder 100 defines a plane. As best shown in FIG. 2, the tape strip 116, when extended from the housing, 102 lies substantially in or substantially parallel to this plane. That is, the tape measure 106 is mounted in the housing 102 so that the tape strip 116, when extended, may lie substantially flat against the wall or other surface being scanned. In order to accomplish this orientation, the spindle 120 of the tape measure 106 is disposed parallel to the plane defined by the back face 118, which, in operation, is placed against a surface to be scanned. As shown in FIG. 1 and FIG. 4, the flat orientation of the tape strip 116 allows a user to easily read the measurement scale 122 of the tape strip 116 from a wide viewing angle.

The tape measure 106 is preferably rotatably mounted within the housing 102 so that the tape strip 116 can be rotated to a number of different positions with respect to the housing 102. The tape measure 106 may be attached to the housing 102 using a collar and ring, a pin and center hole, or any other mounting technique known in the art for rotatable attachment. This rotatable attachment allows the tape strip 116 to be directed over a range of angles. For example, using a clock analogy with respect to FIG. 1, the tape measure 106 may be rotated to allow the tape strip 116 to be extended over a range from about 2 o'clock to about 10 o'clock with respect to the housing 102. Of course, other ranges can be used instead. Detents (not depicted) can be used to precisely locate the tape strip 116 at some predetermined angles. Using the example above, detents could be used to locate the tape strip 116 at separate points or stations, for example, 3 o'clock, 6 o'clock, and 9 o'clock. Stated differently, detents may be used to indicate rotation of the tape measure 106 at, for example, 90 degrees, 180 degrees, and 270 degrees with respect to the central axis 112 of the housing. As is known in the art, detents typically involve a first surface with at least one bump or ball thereon under a load moving across a second surface with a hole or depression disposed therein. When the bump and depression align, the loading force causes a tangible mechanical feedback to align the rotating element, in this case the tape measure 106, at a known, predetermined location. Grip points 124 aid in rotating the tape measure 106 between positions. FIG. 1 shows the tape measure 106 rotated so that the tape strip 116 (shown partially extended) is at the 6 o'clock position with respect to the housing 102. FIG. 4 shows the tape measure 106 rotated so that the tape strip is at the 9 o'clock position with respect to the housing 102.

As best shown in FIG. 1, an automatic tape lock 126 engages the tape strip 116 to keep it extended until released. This action can be implemented by allowing a spring-loaded stop (not depicted) to be disposed against the tape strip 116 to block the tape strip 116 against an inside surface of the housing 102. In one embodiment of the enhanced stud finder 100, the automatic tape lock 126 is designed to allow withdrawing of the tape strip 116 from the tape measure 106, but exerts enough pressure on the tape strip 116 to limit undesired motion of the tape strip 116. The tape strip 116 can be released by depressing the automatic tape lock 126, which releases the pressure applied to the tape strip 116 by the stop. The automatic tape lock 126, which may be implemented using any other desired technique, simplifies use of the enhanced stud finder 100 when one hand is holding the enhanced stud finder 100 and the other hand is used to extend the tape strip 116 to make a measurement.

Figure 5:
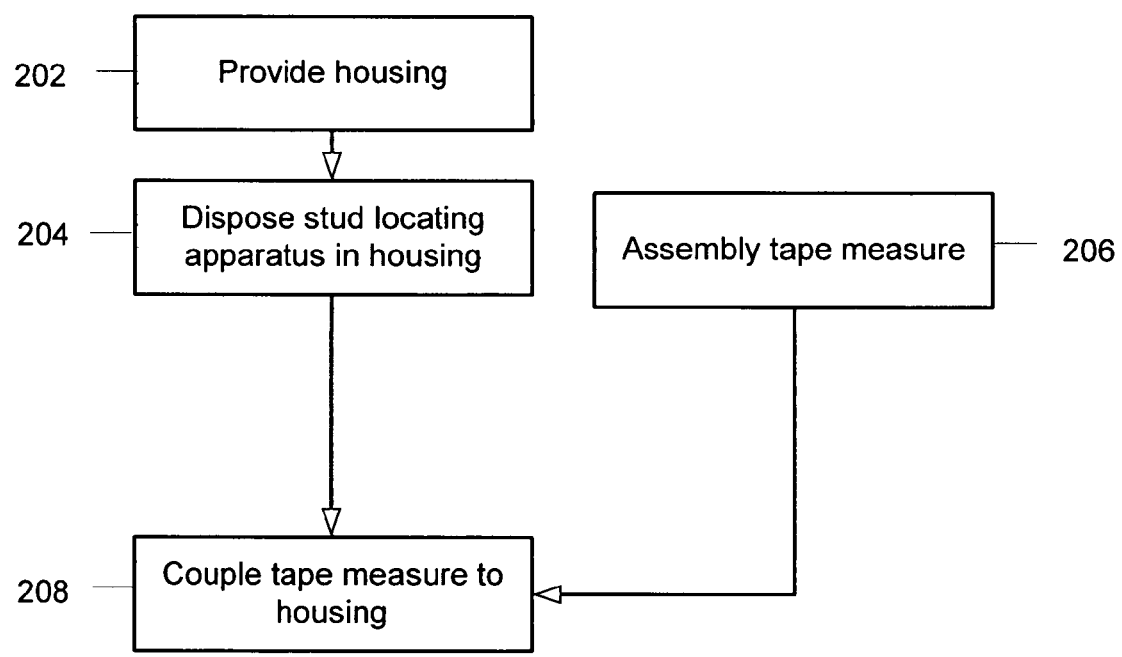
FIG. 5 is an exemplary method of making the enhanced stud finder of FIG. 1.

FIG. 5 shows a flow chart of a method of manufacturing an enhanced stud finder 100. At a step 202, a housing 102 may be provided, the housing 102 including a back face 118 that is substantially flat and defines a plane. The housing 102 may be an elongated shape that is generally symmetric around a central axis 112. The housing 102 may further include a mounting hole along the central axis 112 to allow hanging the enhanced stud finder 100 both for storage and when in use.

A stud locating apparatus 104 may be disposed in the housing 102 at a step 204, as discussed above, in such a manner so that a measurement signal from the stud locating device is directed through the back face 118. At a step 206, a tape measure 106 may be assembled so that the tape strip 116 is wrapped around the spindle 120 with the measurement scale 122 facing the spindle 120. At a step 208, the tape measure 106 is then coupled to the housing 102 so that the tape measure 106 may be rotated through at least 180° and is mounted so that the spindle 120 is parallel to the back face 118 and so that the tape strip 116, when extended, is parallel to the plane defined by the back face 118.

Figure 6:
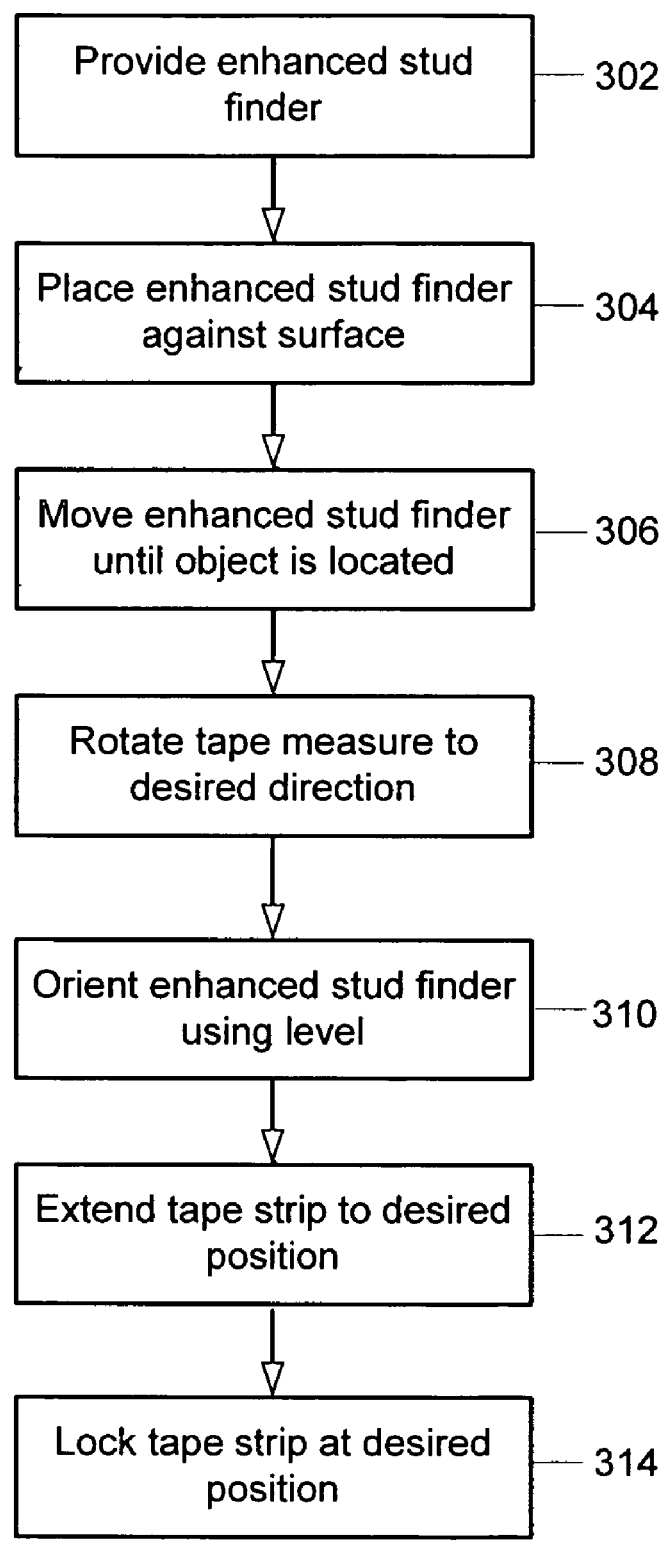
FIG. 6 is an exemplary method of using the enhanced stud finder of FIG. 1.

FIG. 6 shows is a flow chart of an exemplary method of using the enhanced stud finder 100. An enhanced stud finder 100 may be obtained or provided at step 302 and placed at step 304 against a surface to be scanned for a subsurface object (not depicted) such as a stud. The enhanced stud finder 100 may be moved across the surface at step 306 until the subsurface object is located. One or more light emitting diodes 108 and/or an audible signal may indicate the presence of the subsurface object. At a step 308, the tape measure 106 may be rotated to a desired direction, for example, to the six o'clock position. The enhanced stud finder may be oriented using a level 114 at a step 310, in this example, aligned in a vertical orientation to help ensure a more accurate measurement of distance above a floor. The tape strip 116 may be extended to a desired measurement or position at a step 312. Continuing at a step 314, the tape strip 116 may be locked at the desired measurement using a tape lock 126 to facilitate marking the surface or taking additional measurements.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings.

We claim:

1. A stud finder device comprising:
   a housing, wherein the housing includes a back face that is substantially flat and defines a plane;
   a stud locating apparatus disposed in the housing; and
   a tape measure rotatably attached to the housing, wherein the tape measure includes a spindle and a tape strip, the spindle being mounted to remain substantially parallel to the plane defined by the back face when the tape measure is rotated, tape strip with a measurement scale disposed on the tape strip, the tape strip extendably mounted on the spindle such that the tape strip, when extended, is parallel to the plane.

2. The stud finder device of claim 1, wherein the stud locating apparatus is oriented in the housing to direct a stud-finding signal through the back face.

3. The stud finder device of claim 1, wherein the tape measure is rotatable over greater than 180 degrees.

4. The stud finder device of claim 1, wherein the stud locating apparatus includes an indicator that signals when the stud locating apparatus detects a target object.

5. The stud finder device of claim 1, wherein the housing includes an attachment mechanism disposed collinear with a central axis of the housing.

6. The stud finder device of claim 1, further including a level apparatus disposed on the housing.

7. The stud finder device of claim 6, wherein the level apparatus is a bubble vial.

8. The stud finder device of claim 1, wherein the tape measure includes one or more detents for indicating rotation at predetermined angles.

9. A method of manufacturing a stud finder device comprising:
   providing a housing having a central axis and a back face, the back face having a substantially flat surface defining a plane;
   disposing a stud locating apparatus in the housing;
   rotatably mounting a tape measure to the housing;
   marking the tape strip with a measurement scale
   extendably mounting a tape strip on a spindle in the housing with the measurement scale facing the spindle so that the tape strip is parallel to the plane when the tape strip is extended.

10. The method of claim 9, wherein disposing the stud locating apparatus further comprises disposing the stud locating apparatus in the housing so that a measurement signal from the stud locating apparatus is directed through the back face.

11. The method of claim 9, further comprising disposing a mounting hole along the central axis of the housing.

12. A stud finder device comprising:
    a housing having a back face defining a plane;
    a stud locating apparatus disposed in the housing; and
    a tape measure rotatably attached to the housing, the tape measure including a spindle mounted parallel to the plane and a tape strip marked with a measurement scale, wherein the tape strip is parallel to the plane when the tape strip is extended.

13. The stud finder device of claim 12, further comprising a bubble vial level.

14. The stud finder of claim 12, further comprising a mounting hole disposed in the housing.

15. The stud finder of claim 12, further comprising an indicator that signals when the stud locating apparatus detects a target object.

* * * * *